United States Patent
Madsen et al.

(10) Patent No.: US 10,195,538 B2
(45) Date of Patent: Feb. 5, 2019

(54) INTERACTIVE LEARNING BLOCKS

(71) Applicant: DXTR Tactile IvS, Sonderborg (DK)

(72) Inventors: Kenneth Madsen, Sonderborg (DK); Mikkel Wossner Moos, Sonderborg (DK); Frederik S. Nielsen, Aabenraa (DK); Loic De Waele, Brussels (BE)

(73) Assignee: DXTR TACTILE IVS, Sønderborg (DK)

( * ) Notice: Subject to any disclaimer, the term of this patent is extended or adjusted under 35 U.S.C. 154(b) by 0 days.

(21) Appl. No.: 14/877,596

(22) Filed: Oct. 7, 2015

(65) Prior Publication Data
US 2016/0101370 A1    Apr. 14, 2016

Related U.S. Application Data

(60) Provisional application No. 62/061,621, filed on Oct. 8, 2014.

(51) Int. Cl.
*A63H 33/04* (2006.01)
*A63H 33/26* (2006.01)
(Continued)

(52) U.S. Cl.
CPC ............. *A63H 33/042* (2013.01); *A63F 3/04* (2013.01); *A63F 3/0421* (2013.01);
(Continued)

(58) Field of Classification Search
CPC ...... A63H 33/04; A63H 33/042; A63H 33/06; A63H 33/062; A63H 33/065; A63H 33/08;
(Continued)

(56) References Cited

U.S. PATENT DOCUMENTS

| 8,398,470 B2 * | 3/2013 | Gillies | A63F 9/0842 |
|---|---|---|---|
| | | | 273/153 R |
| 2003/0148700 A1 * | 8/2003 | Arlinsky | A63H 33/04 |
| | | | 446/91 |

(Continued)

FOREIGN PATENT DOCUMENTS

| EP | 0914853 A3 | 11/1998 |
|---|---|---|
| WO | WO 2013/006139 | 1/2013 |
| WO | 2014032807 A1 | 3/2014 |

OTHER PUBLICATIONS

International Search Report and Written Opinion by the International Searching Authority for PCT Application No. PCT/IB2015/002127, dated Feb. 24, 2016, 15 pages.

(Continued)

*Primary Examiner* — Gene Kim
*Assistant Examiner* — Alyssa Hylinski
(74) *Attorney, Agent, or Firm* — Nixon Peabody LLP; Eduardo J. Quinones

(57) ABSTRACT

Interactive blocks with sensors for collecting information about how tactile objects are interacted with and with one or more communication interface for sending the interaction data to one or more other device or platform for analyzing the interactivity, providing feedback to a user, and assessing manual ability and dexterousness, cognitive ability, memory and retention, providing challenges based on past performance, learning curve, etc.

9 Claims, 12 Drawing Sheets

(51) Int. Cl.
  *G09B 19/00* (2006.01)
  *H04W 4/02* (2018.01)
  *H05B 37/02* (2006.01)
  *A63F 3/04* (2006.01)
  *A63F 9/12* (2006.01)
  *H04W 4/70* (2018.01)
  *A63F 9/24* (2006.01)

(52) U.S. Cl.
  CPC .......... *A63F 9/1204* (2013.01); *A63H 33/04* (2013.01); *A63H 33/046* (2013.01); *A63H 33/26* (2013.01); *G09B 19/00* (2013.01); *H04W 4/026* (2013.01); *H04W 4/70* (2018.02); *H05B 37/0272* (2013.01); *A63F 2009/2442* (2013.01); *A63F 2009/2444* (2013.01); *A63F 2009/2489* (2013.01); *A63H 2200/00* (2013.01)

(58) Field of Classification Search
  CPC .. A63H 33/086; A63H 33/26; A63H 2200/00; A63F 3/00643; A63F 9/08; A63F 9/24
  See application file for complete search history.

(56) References Cited

U.S. PATENT DOCUMENTS

| | | | |
|---|---|---|---|
| 2005/0196730 A1* | 9/2005 | Kellman | G09B 5/00 434/118 |
| 2006/0134978 A1* | 6/2006 | Rosen | A63H 33/042 439/581 |
| 2006/0172787 A1* | 8/2006 | Ellis | A63F 13/10 463/1 |
| 2007/0184722 A1* | 8/2007 | Doherty | A63H 33/042 439/638 |
| 2008/0280682 A1* | 11/2008 | Brunner | G07F 17/32 463/40 |
| 2009/0197658 A1* | 8/2009 | Polchin | A63F 13/02 463/9 |
| 2010/0001923 A1* | 1/2010 | Zilber | A63F 3/00643 345/1.1 |
| 2012/0122059 A1* | 5/2012 | Schweikardt | A63H 33/04 434/118 |
| 2012/0218211 A1* | 8/2012 | McRae | G06F 1/1656 345/173 |
| 2012/0258436 A1* | 10/2012 | Lee | G09B 19/00 434/362 |
| 2013/0050958 A1 | 2/2013 | Bdeir | |
| 2015/0251104 A1 | 9/2015 | Lange et al. | |

OTHER PUBLICATIONS

EP Communication for Application No. 15 817 538.0, dated Apr. 3, 2018, 7 pages.

* cited by examiner

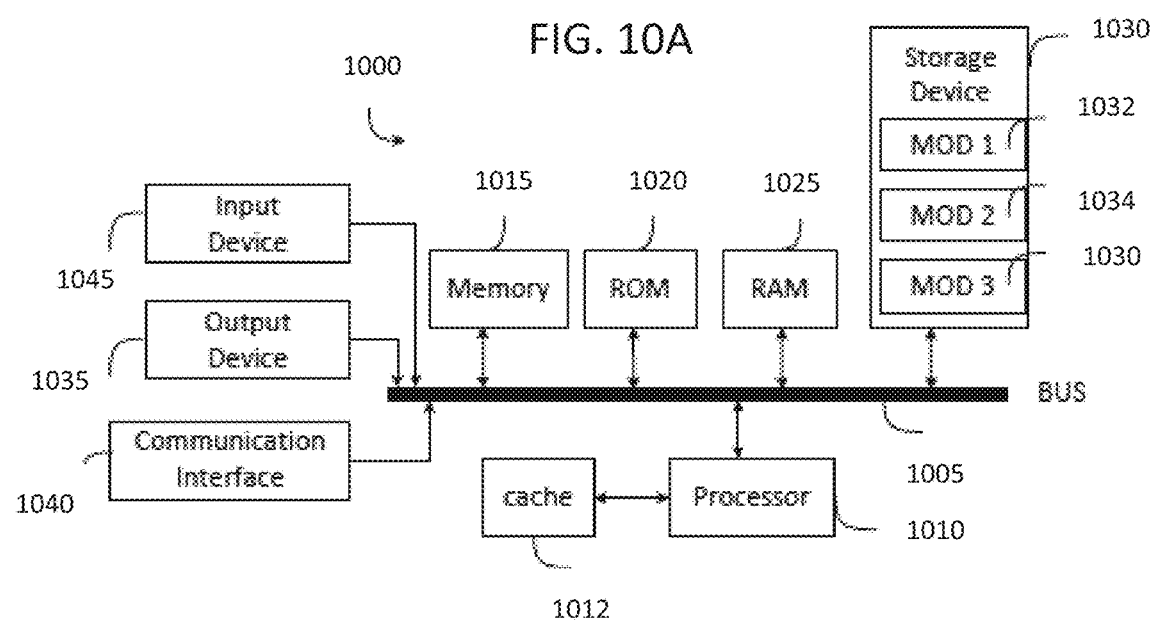

INTERACTIVE LEARNING BLOCKS

CROSS REFERENCE TO RELATED APPLICATIONS

This application claims priority to U.S. provisional application No. 62/061,621, filed on Oct. 8, 2014, entitled "TACTILE INTELLIGENCE PLATFORM", which is expressly incorporated by reference herein in its entirety.

TECHNICAL FIELD

The present technology pertains to interactive objects, and more specifically pertains to wirelessly connected interactive blocks connected to a learning platform through a host device.

BACKGROUND

Human interaction with blocks, toy bricks, and other objects is essentially ubiquitous across societies and cultures. This interaction is encouraged at a very young age to help develop motor skills, learn spatial relationships and basic physics, etc. Even after youth, tactile play is encouraged to entertain, develop further manual dexterity, express artistic and creative skills, develop logical and other cognitive acumen, etc.

Interactive objects having electronic components have been developed in an attempt to enhance the appeal of these objects. Also, some attempts to represent physical objects in virtual environments have been made. However, there are not robust solutions for collecting information about how tactile objects are interacted with, analyzing the interactivity, providing feedback to a user, and assessing manual ability and dexterousness, cognitive ability, memory and retention, providing challenges based on past performance, etc.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Some embodiments of the present technology involve a group of interactive blocks with sensors for collecting information about how tactile objects are interacted with and with one or more communication interface for sending the interaction data to one or more other device or platform for analyzing the interactivity, providing feedback to a user, and assessing manual ability and dexterousness, cognitive ability, memory and retention, providing challenges based on past performance, etc. The interactive blocks can connect to form a network of interactive blocks.

The interactive blocks can include one or more sensors, coupling mechanisms for connecting with neighboring blocks, a wireless communications interface for connecting with another electronic device, a communications interface for communicating with a neighboring block. The interactive blocks can also include a processor and a memory for storing a unique identifier and instructions for processing sensor data, neighbor data from the neighboring interactive block, and other state data. The processor can further cause the wireless communication interface to send the processed data to the electronic device. In some embodiments, the processor causes the wireless communications interface to send raw or partially processed data to the electronic device or other interactive blocks. A decision can be made regarding manner and degree of pre-processing the processor can apply to the sensor data based on timing, connections between blocks and the base station, and the capabilities of the sensor data source.

The interactive blocks can also include a light source, such as a field-programmable light-emitting diode (LED), and the blocks can receive a lighting instruction that causes the light source to light up. In some embodiments, the blocks have sides with translucent regions for allowing light from the light source therethrough.

The interactive blocks can also include a base station that receives interaction and sensor data and sends the data to an electronic device or network-based platform. The base station can also be configured with a wireless (e.g., inductive) or physical (e.g., conductive) charging interface and the blocks can include a rechargeable power source an electrical contact capable of communicating power level information and receiving power from the base station.

In some embodiments of the present technology, an electronic device is coupled with a group of interactive blocks and the electronic device displays a task relating to the group of interactive blocks that test a wide variety of the user's mental acuity, dexterity, spatial awareness, creativity, etc. The electronic device can continuously receive state data for the collection of interactive blocks that describes how a user manipulates the interactive blocks relative to each other while attempting to complete the task.

Some embodiments of the present technology involve displaying, in near real-time, a dynamic virtual representation of the group of interactive blocks and determining, based on the received state information, task process for the task. Based on the task process, the electronic device, the blocks, or both can provide the user with a hint for completing the task. After detecting a task completion event, the electronic device can send task information to a tactile IQ platform and receive, in return, a task score and/or a recommendation for performing one or more further tasks. In some embodiments of the present technology, the task score can involve a comparison of how well the user completed the task compared to a cohort or peer group.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 10A-10B illustrate exemplary possible system embodiments.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

The disclosed technology addresses the need in the art for robust solutions for collecting information about how tactile objects are interacted with, analyzing the interactivity, providing feedback to a user, and assessing manual ability and dexterousness, cognitive ability, memory and retention, providing challenges based on past performance, etc.

I. Introduction—Interactive Objects and Communication with a Host Device

Figure 1:
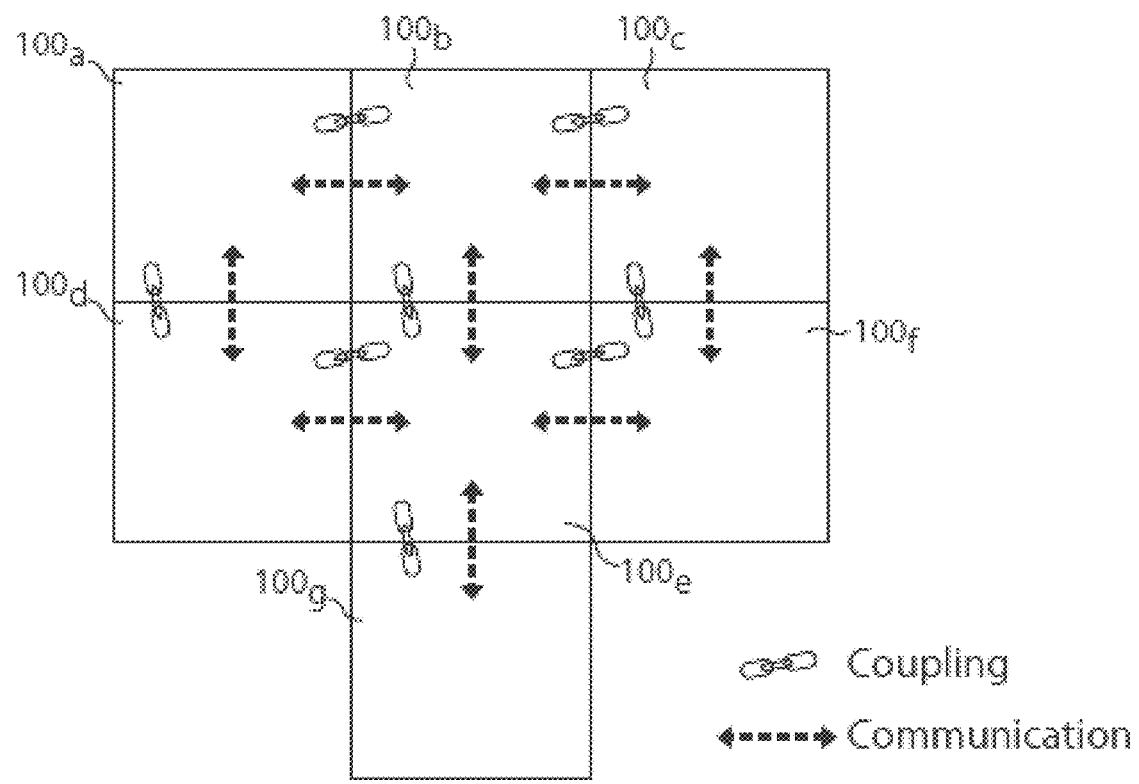
FIG. 1 illustrates an example of a group of interactive objects according to some embodiments of the present technology.

FIG. 1 illustrates an example of a group of interactive objects 100 ($100_a$-$100_g$). The interactive objects $100_a$-$100_g$ can be physically coupled to multiple other interactive objects $100_a$-$100_g$ (represented by a chain link in FIG. 1) and, similarly, can be decoupled.

The coupling between interactive objects $100_a$-$100_g$ can be accomplished through a wide variety of means, for example, a mechanical latch, magnetic attraction, adhesive, ball and socket, tube and stud, fastener, etc. In some embodiments, the physical coupling is accomplished by one interactive object 100 having a male component and a complimentary interactive object 100 having a female component; alternatively, both interactive objects 100 in a coupling can have symmetrical coupling features. In some embodiments, interactive object 100 can couple along multiple faces or features of interactive object 100. In some embodiments, the physical coupling is accomplished or assisted by gravity and/or friction.

Coupling multiple interactive objects 100 can allow the creation of various three dimensional shapes, figures, designs, and arrangements. For example, FIG. 1 crudely depicts a tree.

In some embodiments, interactive object 100 is a cube or cuboid with six faces. Alternatively, interactive object 100 can be any n-faced object that can be coupled with another n-faced object, where n and m may be identical or different. Although planar faces provide certain benefits such as retaining a degree of freedom when coupling, interactive object 100 can have at least some curved faces as well. In some embodiments, an interactive object of one configuration (e.g., the number or type of faces) can couple with an interactive object of a different configuration.

Additionally, each interactive object 100 contains a processor, a sensor, a communication interface, internal circuitry, and can be configured to communicate with each other. For example, interactive object $100_a$ can be in communication with interactive object $100_b$ (represented by dashed double arrow). In some embodiments, the communication interface is wireless (e.g., sound, light, or other electromagnetic radiation such as Bluetooth, WiFi, NFC, RFID, etc). In some embodiments, interactive objects 100 share a common bus. Additionally, in some embodiments, interactive object 100 can also provide and/or receive power through the communication interface, as explained in greater detail below.

In some embodiments, interactive objects 100 are only in communication with adjacent interactive objects 100 (e.g., those that are inter-coupled). Alternatively, as explained in greater detail below, interactive objects 100 can be in communication with nearby interactive objects 100, regardless of adjacency (e.g. in a mesh network). For example, interactive object $100_d$ can be in communication with interactive object $100_f$.

As explained in greater detail below, interactive objects $100_a$-$100_g$ can be configured with sensors that can capture data relating its individual orientation, its position relative to another object, whether it is connected to one or more other objects, etc. For example, the interactive objects $100_a$-$100_g$ can include one or more of an accelerometer, gyroscope, magnetometer, inertia moment unit, etc.

Furthermore, each of the interactive objects $100_a$-$100_g$ can be configured with a communication circuitry and can communicate information pertaining to its location (e.g., its placement in space, its relative position with respect to a coordinate system, or its position relative to other interactive objects), orientation, movement (e.g., translation or rotation), coupling status, nearby interactive objects, or current state. For example, in some embodiments, interactive object 100 can also communicate with a base station or other client device. Likewise, the communication circuitry can receive information from a base station or client device for controlling one or more aspect of the interactive object 100. For example, the interactive objects $100_a$-$100_g$ can contain light sources and a client device can send the interactive objects $100_a$-$100_g$ a control signal for controlling the light sources, as explained in greater detail below.

Figure 2:
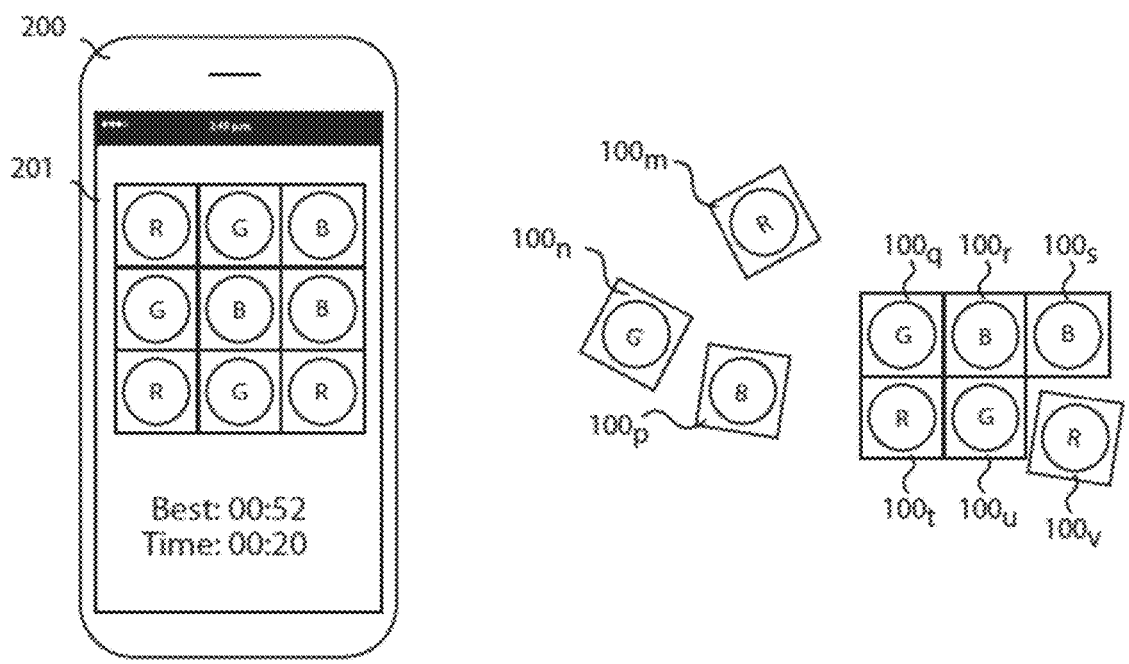
FIG. 2 illustrates a group of interactive objects in communication with a portable electronic device according to some embodiments of the present technology.

FIG. 2 illustrates a group of interactive objects $100_a$-$100_g$ in communication with a portable electronic device 200 (e.g., via a base station) according to some embodiments of the present technology. As explained below in greater detail, the portable electronic device 200 can communicate with a network of interactive objects through a base station. The network of interactive objects can be of various topologies (e.g., a mesh, bus, point-to-point, star, ring, tree, etc.). For example, each interactive object can independently connect to a base station and the base station can then connect to the portable electronic device 200.

In some embodiments, portable electronic device 200 communicates with only one interactive object 100 (which might, in turn, communicate with other interactive objects 100 and relay information to portable electronic device 200). Alternatively portable electronic device 200 can communicate with multiple interactive objects 100. In some embodiments, the communication is wireless (e.g., sound, light, or other electromagnetic radiation such as Bluetooth, WiFi, NFC, RFID, etc) or wired (e.g., a physical connection such as through a wire connected to interactive object 100 or by placing interactive object on a conductive surface).

In some embodiments, communication between portable electronic device 200 and interactive object 100 can be bidirectional. For example, portable electronic device 200 can send commands to interactive object 100, e.g., to change the color of light(s) embedded in interactive object, activate a motor, play a sound, etc. Also, one or more of the interactive objects $100_a$-$100_g$ can communicate back to the portable electronic device 200. For example, an interactive object can send the portable electronic device 200 information describing the interactive object's 100 state, position, location, orientation, etc. Likewise, a first interactive object 100 can communicate information about another interactive object 100. Accordingly, the portable electronic device 200 can learn the relative orientation and position of each of the interactive objects $100_a$-$100_g$.

The portable electronic device 200 can also execute one or more application 201 configured for bidirectional communication and interaction with the interactive objects $100_a$-$100_g$ and for providing a user with feedback about the orientation of the interactive objects $100_a$-$100_g$ and about a task to be performed using the interactive objects interactive objects $100_a$-$100_g$, as explained in greater detail below.

For example, as shown in FIG. 2, the application 201 can control (e.g., turn on, off, blink, etc.) a light source (e.g., using a Boolean toggle or instruction such as RGB, HSL, sRGB, CMYK, grayscale value, etc.) of the interactive objects $100_a$-$100_g$ and present a task to a user (e.g. assembling the interactive objects $100_a$-$100_g$) and keep track of how well (e.g. how quickly) the user performs the task. As the interactive objects $100_a$-$100_g$ are manipulated by the user, the interactive objects $100_a$-$100_g$ send back information to the application regarding their configuration relative to each other. Once the interactive objects $100_a$-$100_g$ are configured according to the task, the application 201 can provide task feedback to the user. Also, as explained in greater detail below, the application 201 can be configured to communicate task performance details with a task platform over a network connection and the task platform can process the task performance details, compare the task performance details with other users' data, send the application 201 comparison results, send the application 201 suggestions for further tasks, etc.

The application 201 can also be configured to allow a user to perform "free play". Free play can involve the application 201 tracking the location, orientation, connection status, etc. of a group of interactive objects $100_a$-$100_g$ and present a virtual model of the interactive objects $100_a$-$100_g$ on the portable electronic device 200. Likewise, the application 201 can provide user-selectable controls for controlling one or more aspect of the interactive objects, e.g. the color of the light source in an interactive object 100.

A wide variety of other applications can be used in conjunction with the interactive objects $100_a$-$100_g$, some of which are explained in greater detail below and some of which will be apparent to those with ordinary skill in the art having the benefit of the present disclosure.

II. Interactive Object Details

Figure 3A:
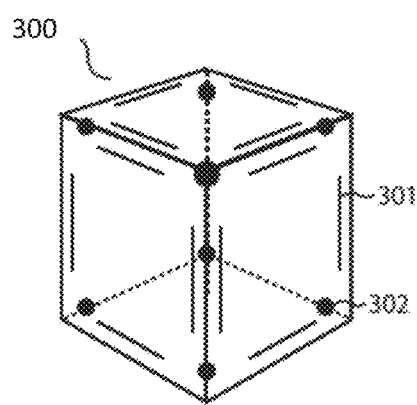
FIG. 3A illustrates an example of an interactive block according to some embodiments of the present technology.

FIG. 3A illustrates an example of an interactive block 300 according to some embodiments of the present technology. The interactive block 300 can have communications interface 301 for communicating with nearby interactive blocks or other devices. In some embodiments, communications interface 301 is centrally located near an edge of the interactive block 300. In some embodiments, there are communications interfaces 301 along each edge of each face of interactive block 300—making twenty-four communications interfaces 301 per interactive block 300. In some embodiments, communications interface 301 can be located in the centroid of a face or near a corner. In some embodiments, communications interface 301 is wireless and can be located anywhere within interactive block 300.

As shown in FIG. 3A, a coupling mechanism 302 can be used to physically connect two interactive blocks 300 as described above. In some embodiments, coupling mechanism is located at each corner of interactive block 300.

Figure 3B:
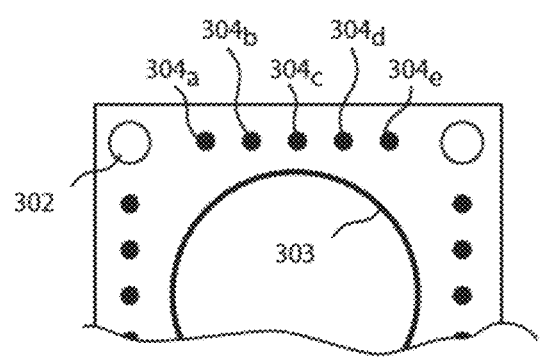
FIG. 3B illustrates a close-up view of an interactive block according to some embodiments of the present technology.

FIG. 3B illustrates a close-up view of an interactive block 300 according to some embodiments of the present technology. As shown, the communications interface 301 can include multiple contacts 304a-304e (collectively, "contact 304"). In some embodiments, contact 304 can be exposed so that a circuit is complete when the faces of two interactive blocks 300 come in contact. In some embodiments, contacts 304 are reversible such that contacts 304 can align with similarly-ordered contacts 304 or reversed-ordered contacts 304. For example, contacts 304a-304e of one interactive block 300 can connect with, respectively, 304a-304e of another interactive block 300 or with, respectively 304e-304a of the other interactive block 300.

In some embodiments, interactive block 300 can have window 303 which can allow light to pass through. Window 303 can be transparent, semitransparent, or translucent. In some embodiments, window 303 can include an entire face of interactive object; alternatively, window 303 can include only a portion of a face. In some embodiments, interactive block 300 can a single window 303 or multiple window portions 303 (e.g., each face of interactive block 300 can have window 303). In some embodiments, a single light source from within interactive object 100 can shine through multiple window portions 303. For example, the single light source can be a field-programmable light-emitting diode ("LED"). Alternatively, each window 303 can have distinct light sources. In some embodiments, window 303 can be a light affixed without any covering (e.g., an LED attached to the face of interactive block 300).

Figure 4A:
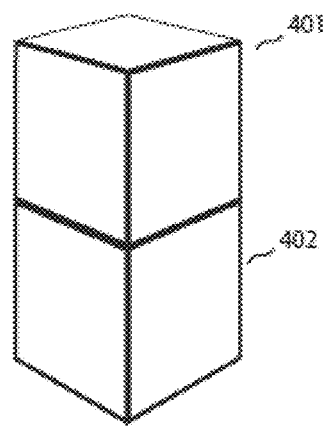
FIGS. 4A-4C illustrate various examples of how interactive blocks can inter-couple according to some embodiments of the present technology.
Figure 4B:
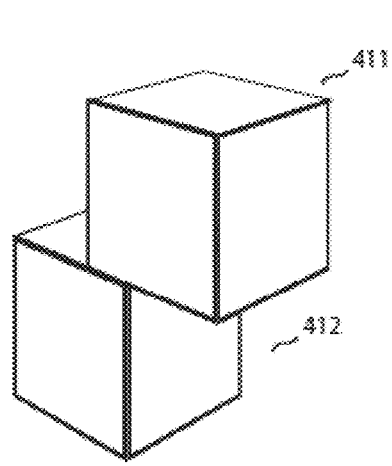
Figure 4C:
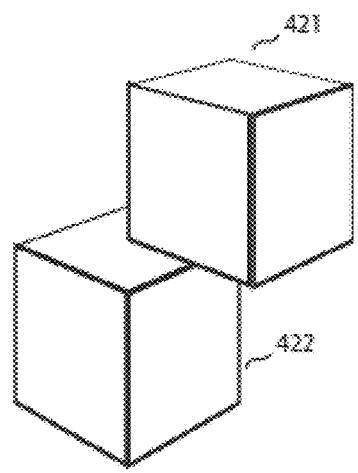

FIGS. 4A-4C illustrate various examples of how interactive blocks can inter-couple according to some embodiments of the present technology. For example, in FIG. 4A, interactive block 401 can connect with interactive block 402 such that the facing sides of the interactive blocks 401, 402 are completely aligned. In such configuration, multiple coupling mechanisms 302 can couple the two interactive objects (e.g., four magnet pairs) and multiple communications interfaces 301 can interconnect the two interactive objects (e.g., four communications interface 301 pairs). Alternatively, the interactive blocks can only connect using one communications interface 301 pair. As shown in FIG. 4B, one interactive block 411 can connect with another interactive block 412 on an offset, with only half of a face being in contact. In some embodiments, this configuration can utilize only two pairs of coupling mechanisms 302 and one pair of communications interfaces 301. In some embodiments, communications interface 301 can be reversible, this can permit interactive blocks to connect as shown in FIG. 4A and FIG. 4B while maintaining communication. FIG. 4C shows another example configuration of two interactive blocks. For example, interactive block 421 can be connected with interactive block 422 at an offset with only a quarter of a face being in contact. In some embodiments, an interactive block is configured such that it can physically couple via coupling mechanism 302 even if communications interface 301 is incapable of establishing a connection between two interactive blocks. Using only the connection options provided in FIGS. 4A-4C, there are $6^2*4$ (FIG. 4A)+$24^2$ (FIG. 4B)+$24^2$ (FIG. 4C)=1248 connection possibilities using just two blocks. The more blocks used can exponentially increase the connection possibilities.

Figure 5:
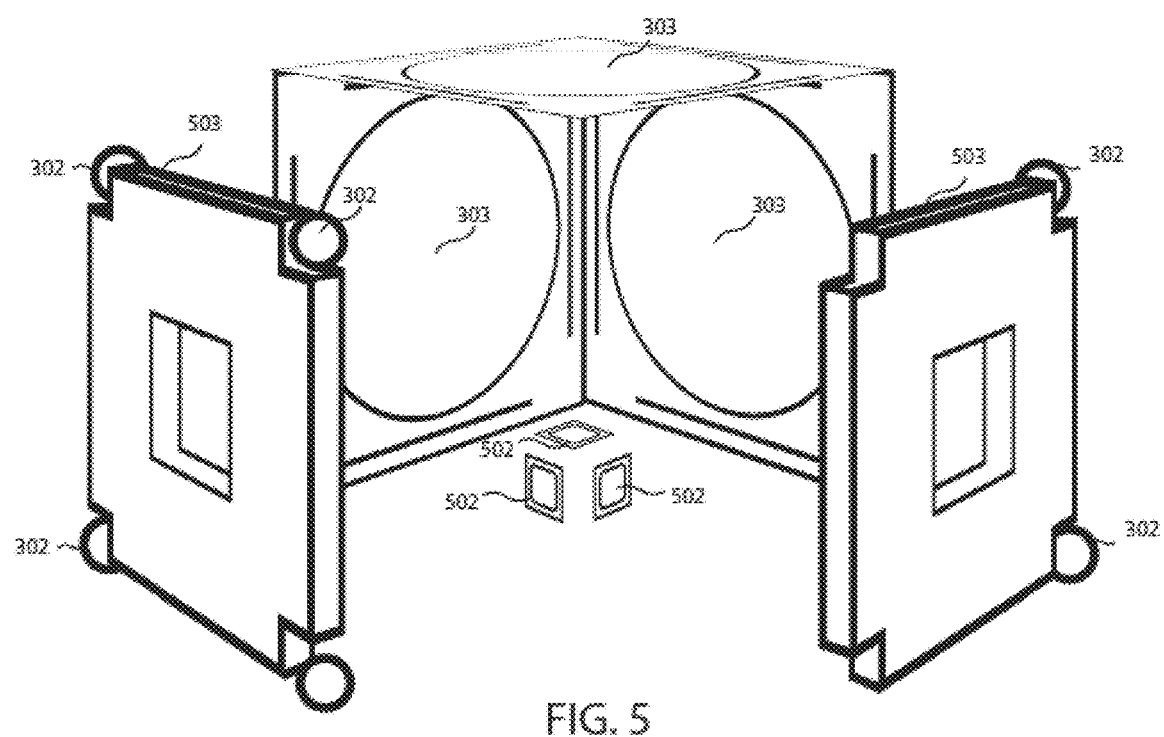
FIG. 5 shows a partially exploded view of an interactive object showing some components that can be present within interactive object according to some embodiments of the present technology.

FIG. 5 shows a partially exploded view of an interactive object showing some components that can be present within interactive object. One or more light sources 502 can be various light emitting sources such as LEDs, light bulbs, electroluminescent wire, etc. A carrier 503 can fit within the faces of interactive object 100. The carrier 503 can be made of a stiff material such as foam or plastic. In some embodiments, the carrier 503 as shown in FIG. 5 is only one side of a multi-sided carrier 503. For example, the two carrier 503 portions in FIG. 5 can be attached, alternatively three or more portions can be combined to form a cuboid. The carrier 503 can provide structure for interactive object 100 and hold components in place, such as communications interface 301, coupling mechanism 302, lights 502, etc. In some embodiments, carrier 503 has a hollow portion.

Figure 6:
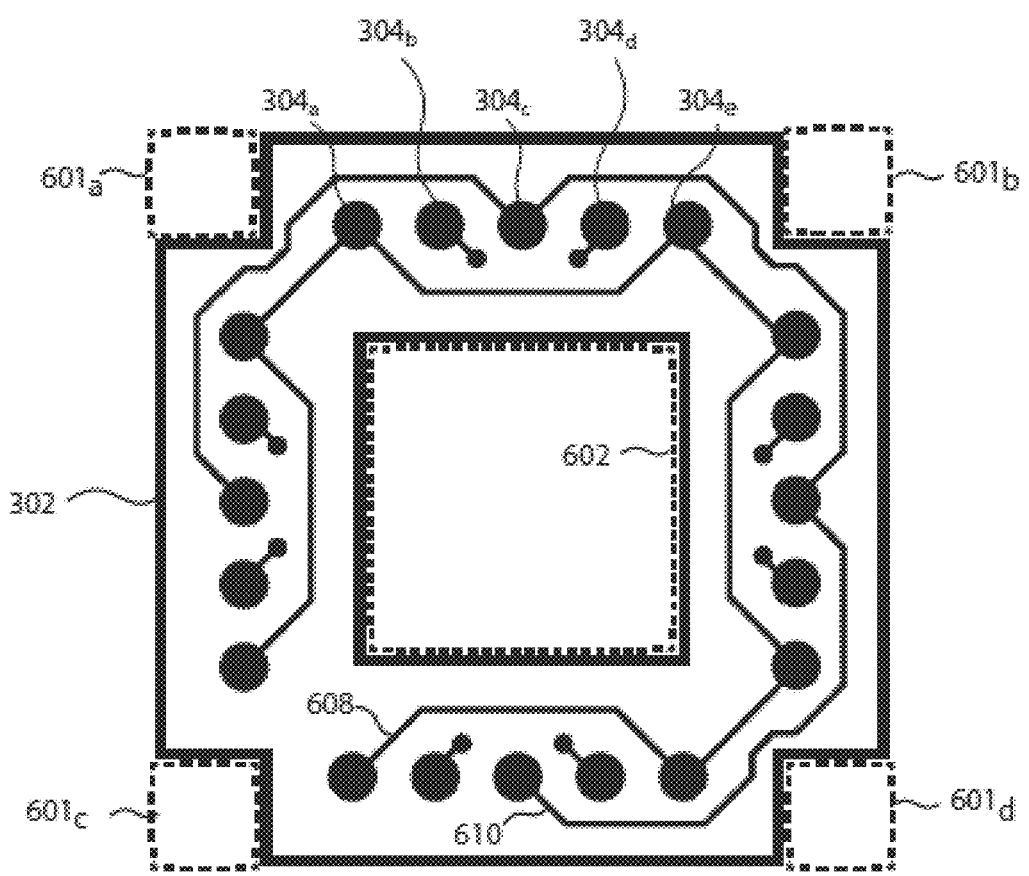
FIG. 6 shows a two-dimensional view of a face of carrier for an interactive object according to some embodiments of the present technology.

FIG. 6 shows a two-dimensional view of a face of the carrier 503. The carrier 503 can contain a communications interface (not shown) as well as contacts 304a-304e. In some embodiments, carrier 503 is or contains a printed circuit board with traces supplying power and connectivity to different components. As described previously, communications interface 301 can be reversible; thus, in some embodiments, contacts can be symmetrical. For example, contact 304a can be connected to 304e. In some embodiments, two contacts 304 can be programmatically interchangeable; for example, a processor can detect that contact 304b should be configured for one role (e.g., output) and another contact 304d should be configured for another role (e.g., input). The carrier 503 can facilitate various communications standards such as TWI, I2C, SPI, etc. for internal communication and communication with other blocks. In some embodiments, a block can communicate information such as a universal unique identifier (UUID). The carrier 503 can contain through-holes to interconnect with components internal to carrier. The carrier 503 can have cutouts 601a-601d to house coupling mechanisms 302 (e.g., a spherical magnet). Carrier 503 can also have an aperture 602 so that light from lights 502 can pass through to window 303. In some embodiments, trace 608 and trace 610 provide one of positive or ground voltage to contacts 304 and other components. In some embodiments, one interactive object 100 can impact power through contacts 304 to another interactive object.

The interactive blocks are also configured with one or more Micro Control Units (MCU) connected to the PCB and trace and that is coupled with a power supply. The MCU is also connected to one or more memory device has stored a unique identification number. In some embodiments, the interactive blocks are connected in a network using a base station. Alternatively, the interactive blocks can be connected using other network topologies.

Figure 7:
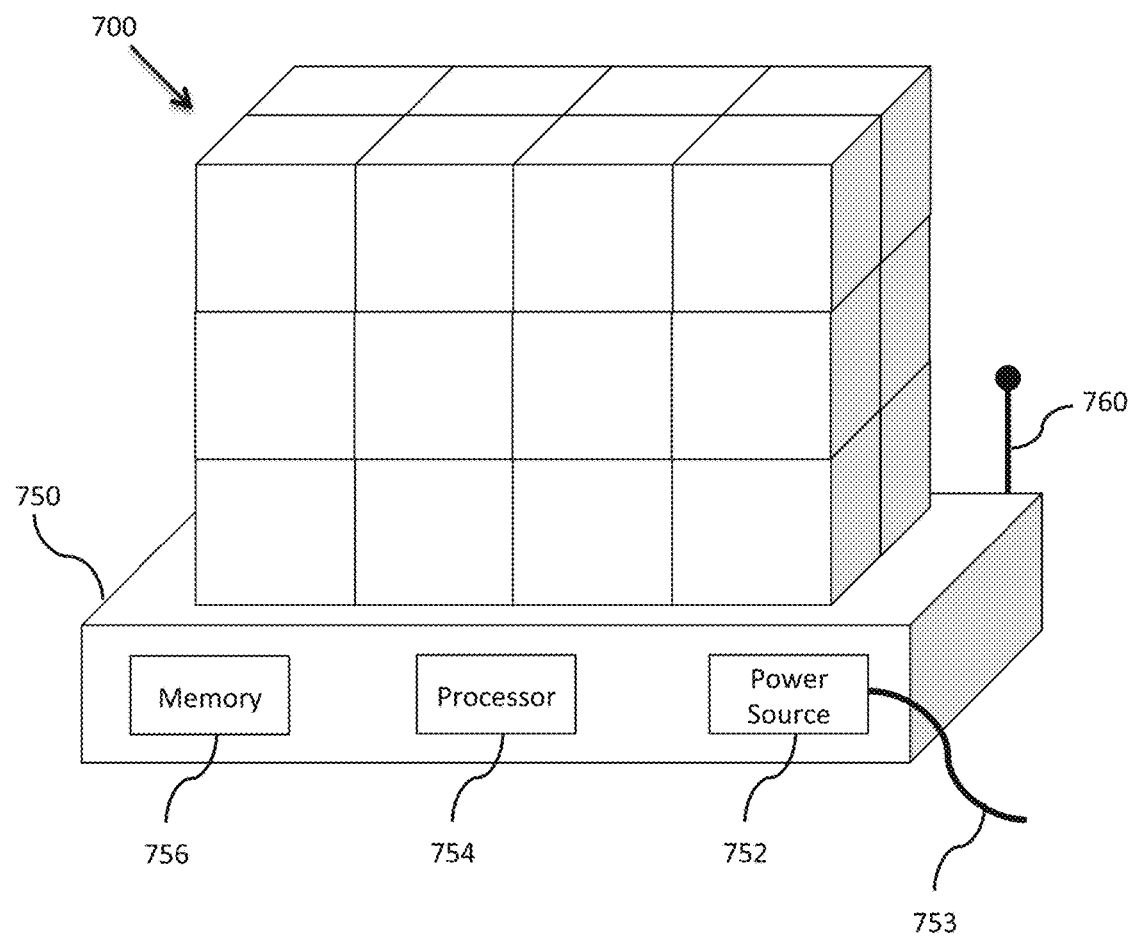
FIG. 7 illustrates a group of interactive blocks connected through a main base station according to some embodiments of the present technology.

FIG. 7 illustrates a group of interactive blocks 700 connected through a main base station 750 according to some embodiments of the present technology. The main base station 750 includes a power source 752 with plug cord 753, a processor 754 and a memory 756 storing a main program for connecting the blocks in a network, registering captured data, managing power and charging for the blocks, etc. The main base station 750 can also include a communication interface 760 for connecting to a portable electronic device and/or a cloud-based platform for tracking block data and task data (explained in greater detail below).

The group of interactive blocks 700 can be connected together in a network. The unique unit identification number of each of the blocks allows the base station to know which services are available and the base station can capture the data captured by an internal accelerometer, gyroscope, magnetometer, and/or inertia moment unit (IMU). The communication interface 760 can also communicate with a display, a portable electronic device, an application in a cloud-based platform, etc.

Using this captured data, the base station 750 can track how the blocks 700 are manipulated and the base station (or a connected portable device, an application of a cloud-based platform, etc.) can provide feedback to a user, e.g. by creating a virtual image of what is being build, providing task completion data, etc. and displaying the virtual image.

In some embodiments, each block effectively works as a node in the network, allowing several other blocks to connect to the network through it, thereby allowing the number of attached blocks to a single network to grow to the limits of whichever protocol is the basis for the network.

Additionally, in some embodiments of the present technology the base station 750 configured for physical, inductive, or other wireless charging of the blocks 700. In these embodiments, each interactive block is embedded with a battery and charging logic and distributed simultaneous charging can be achieved through either a physical, inductive, or other wireless connection, ensuring simultaneous or consecutive recharging by the base station 750 without any form of disassembly or introduction of a cable to the object. The base station 750 will send a current up to a first layer of blocks. Each of the blocks 700 will manage its own battery status and alert the base station 750 if it needs power. The base station 750 sends a power supply out through multiple channels to ensure the right amount of power for multiple blocks at the same time. During charging the embedded circuit of a single block will direct any input of power to the battery charger. When the battery is fully charged the circuit will lock the input to the battery in order to let the other connected blocks in the stack have more charging power.

In some embodiments, battery life is prolonged through power down actions, prompted by the lack of activity in the accelerometers/motion sensors or in the connections of the blocks. This initiates an interrupt in a main program stored in memory of the base station 750 and executed by the blocks' MCU, thereby issuing a power down of the main system components. After a power down, the blocks 700 exist in a standby mode with next to no power drain is occurring. When activity is registered by the accelerometer or external connections in standby mode an interrupt activates the main program and signs the object back into the system.

In some embodiments, battery life cycles are tracked through the base station and compared across all batteries. In order to optimize life cycles, the blocks can be discharged and then recharged during downtime as to preserve maximum long-term capacity for current Lithium-Ion battery technology.

III. Tracking Object Interaction, Tactile Intelligence, and Cloud-Based Platform As explained above, some embodiments of the present technology involve interactive objects communicating information to an electronic device pertaining to their location, orientation, movement (e.g., translation or rotation), coupling status, nearby interactive objects, current lighting status, etc. with a host device. A host device can be a base station, a phone, tablet, other portable electronic device, laptop computer, dedicated machine, gateway, router, etc. The interactive objects can communicate the information through a base station or an integrated communication module (e.g. Bluetooth).

Figure 8A:
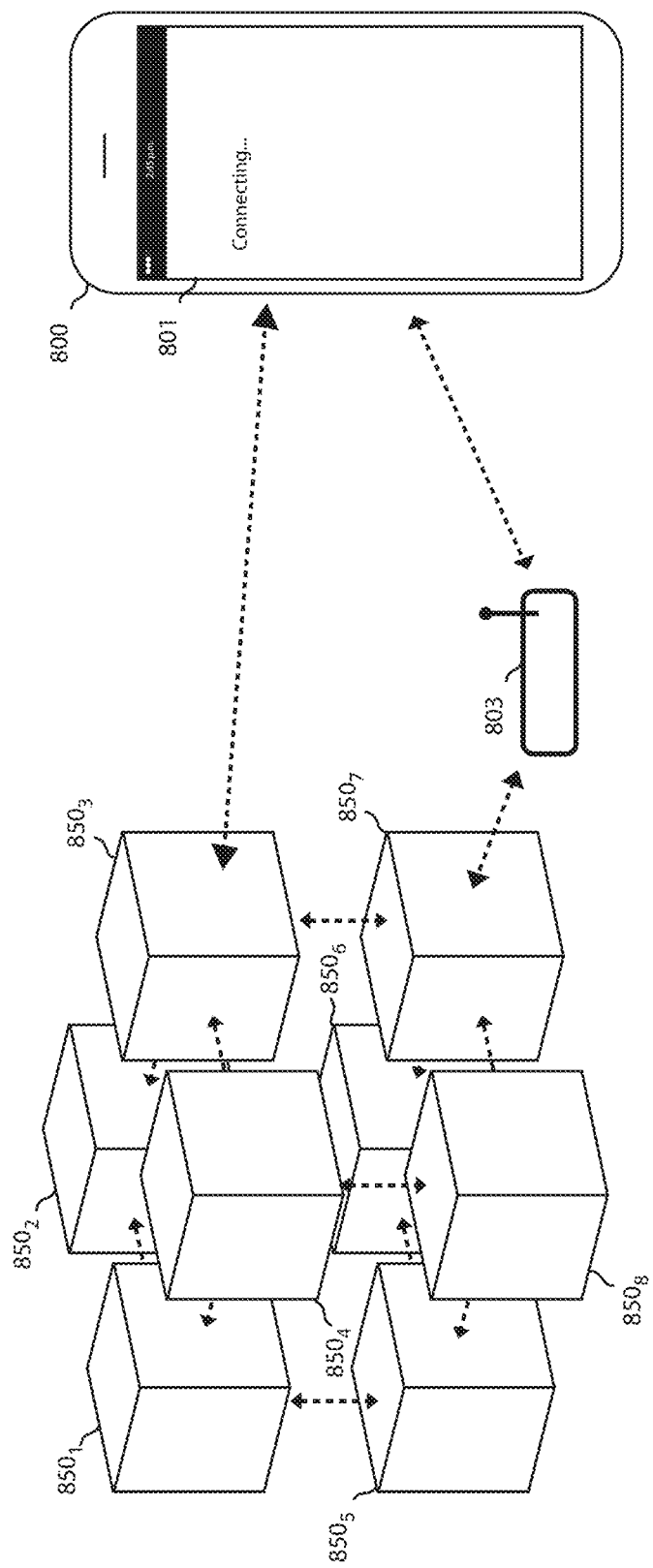
FIG. 8A illustrates a group of interactive objects in communication with a portable electronic device according to some embodiments of the present technology.

FIG. 8A illustrates a group of interactive objects 850 in communication with a portable electronic device 800 according to some embodiments of the present technology. In some embodiments, portable electronic device 800 directly connects with only one interactive object (e.g., $850_3$), which can route communications to other interactive objects 850. Alternatively, portable electronic device 800 can connect with multiple interactive objects 850. In some embodiments, portable electronic device 800 connects with all available interactive objects 850. In some embodiments, portable electronic device 800 only connects to interactive objects 850 that satisfy certain criteria, such as the closest one(s) (e.g., interactive object $850_3$ and $850_7$) which then relay communications with other interactive objects 850. In some embodiments, a limited number of interactive objects 850 have the capability (e.g. Bluetooth module) with communicating with portable electronic device 800. In some embodiments, communication between portable electronic device 800 and interactive objects 850 is accomplished via base station 803. In some embodiments, base station 803 receives data from one entity (e.g., interactive object 850 or portable electronic device 800) and processes it, relaying only the processed data to another entity.

Communication between interactive objects 850 can be accomplished using a communications interface (e.g. communication interface 301 in FIG. 3A above). In some embodiments, interactive objects 850 share data with each neighboring interactive object 850. For example, interactive object $850_1$ can share data with interactive objects $850_2$, $850_4$, and $850_5$. In some embodiments, interactive objects 850 use data it receives to gain situational awareness. For example, if interactive object $850_5$ communicates its orientation to interactive object $850_6$, interactive object $850_6$ can determine its own orientation even if it otherwise lacks a module to help determine its orientation.

The data shared between interactive objects 850 and portable electronic device 800 can include sensor data, relative position data, status data (e.g., current state of lights), and data relayed from other interactive objects 850. Using this data, the portable electronic device 850 can determine the overall shape and configuration of multiple interactive objects 850 that are connected in the network 850. For example, the data can describe that the interactive objects 850 are forming the shape of a house and that interactive objects 850 with lights of specific colors are in various positions of the house shape. In some embodiments, multiple connected interactive objects 850 can act as one unit.

As explained above, the present technology can address the need in the art for robust solutions for collecting information about how tactile objects are interacted with, analyzing the interactivity, providing feedback to a user, and assessing manual ability and dexterousness, cognitive ability, creativity, memory and retention, etc. and providing challenges based on past performance, etc.

For example, the interactive objects can be used to perform tasks that test a user's mental acuity, spatial awareness, creativity, etc. As shown in FIG. 8A, a user can be presented a task through an application 801 on the portable electronic device 800 and the user's performance can be monitored by the application 801. For example, the application 801 can present the user with a challenge and begin a timer that measures the amount of time the user has taken to complete the challenge. The application 801 can monitor the configuration of the interactive objects 850 and, when the interactive objects are in the appropriate configuration to complete the challenge, the application 801 can determine that the challenge is complete and can stop the timer.

Sensor data from the interactive objects 850 can describe the user's attempt at completing the task. This task data collected throughout the attempt can provide an indication as to how effective and efficient the user was at completing (or partially completing the task). The task data can include a history of how the interactive objects are manipulated, connected, disconnected, reconnected, etc. over the duration of the test. Also, the test data can include information about the extent that clues are provided to the user—either through the application 801 or through the interactive objects 850 themselves (e.g. via LEDs).

In some embodiments of the present technology, the application 801 is configured to provide a wide variety of tasks for observing, testing, analyzing, etc. a wide variety of mental abilities, tactile and dexterity abilities, memory abilities, etc. Example tasks (e.g., test or challenges) include puzzles, memory tests, retention tests, tap tests, fine motor tests, dexterity texts, logical thinking tests, critical thinking tests, and other cognitive assessment tests. In some embodiments, tasks are similar to standardized and accredited tests.

In some embodiments, a task might include having the user create structures such as a representation of a human out of interactive objects. Some tasks can include each face of interactive objects being illuminated by one or more colors and a certain cue (e.g., a blinking face of a certain color) can indicate that the user should connect that face with a similarly colored face on another interactive object. Some tasks can include noticing faces that have illuminated in sequence and reproduce the sequence by tapping those faces in the correct order. Some tasks can include building a structure using interactive objects 850 based on a picture displayed in an application. In some embodiments, such a structure can require that specific interactive objects are placed in specific places with designated orientations, as indicated by colors shown on their faces.

Some tasks can utilize interactive features of the application in combination with interactive object to prompt a user to complete two tasks (one using interactive object and another using the electronic device) simultaneously, thus causing the user to divide their attention between two tasks. For example, a user might be asked to build a structure with interactive objects while memorizing a sentence said on a speaker of an electronic device according to user application. Some tasks can include rebuilding a structure out of interactive application from memory. For example, the user can be asked to tell a story on one day using interactive object and the next day the user will be asked to repeat the story while building the same structure. Some tasks can include having a user design a structure with interactive object; another person (e.g., a parent or observer) can then attempt to guess what the structure represents (e.g., a chair).

In some embodiments, user application provides a game-like environment in which the user can be presented with various challenges, games, and tasks. These challenges, games, and tasks can entertain, train, and monitor the user.

In some embodiments of the present technology, individual task data can be summarized individually and multiple task data summaries can be aggregated to form scores describing the user's "tactile IQ." A tactile IQ can be a measure of metrics including speed, dexterity, short term memory, long term memory, working memory, critical thinking, creativity, spatial cognition, adaption, problem solving, concentration, etc.

Also, after an application administering a task collects data from interactive objects, it can send raw or synthesized data to another platform for analysis. The platform can process the task data and compare a user with the user's peers or other members. A user's peer group can consist of users of the same age, gender, location, etc.

Figure 8B:
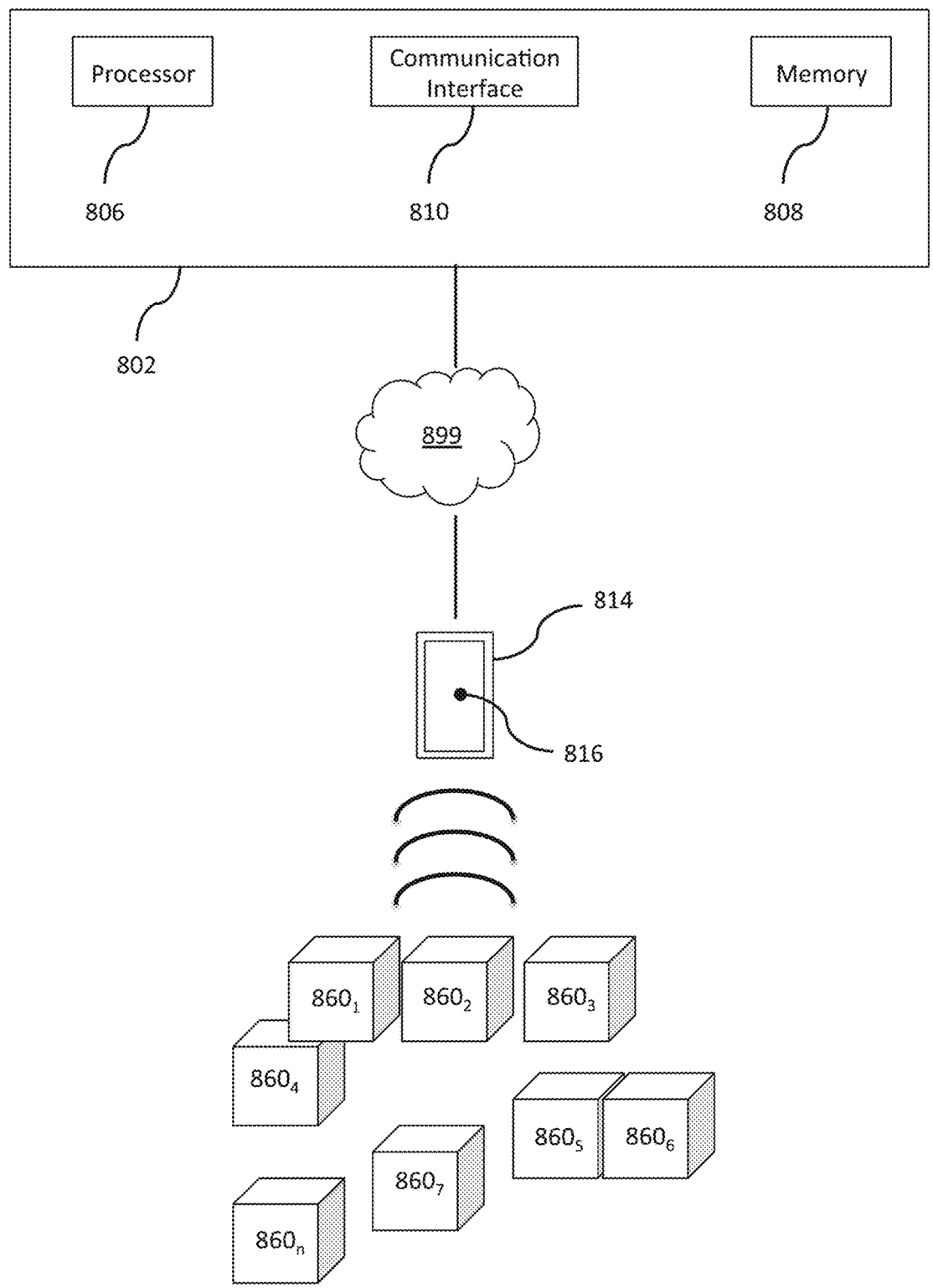
FIG. 8B illustrates a network-based tactile IQ platform configured to monitor user interaction with interactive blocks, collect user task data, and synthesize feedback based on the task data for the user as well as task data from a community of users according to some embodiments of the present technology.

FIG. 8B illustrates a network-based tactile IQ platform 802 configured to monitor user interaction with interactive blocks 860, collect user task data, and synthesize feedback based on the task data for the user as well as task data from a community of users.

A user can be administered a task relating to a group of interactive blocks $860_1, 860_2, \ldots 860_n$ through a portable electronic device 814 running an application 816. The interactive blocks 860 can communicate data regarding their orientation, position, coupling status etc. to the application 816—either directly via a communication link or through a base station. The application 816 can process and package the task data and send it to the platform 802 through a network 899 for analysis.

The platform 802 can include a processor 806, memory 808, and a communication interface 810. The platform 802 can receive task data from the portable electronic device 814 through the communication interface 810, process the data, compare the processed data to other users' data that are stored in the memory 808, and calculate a result in the form of a pass/fail, score, tactile IQ, etc. The platform 802 can then send the results back to the portable electronic device 814 for display in the application 816.

Task results can provide an overview on the performance of the user and can provide suggestions to enhance the user's performance. For example, task results can provide suggestions that are based on general knowledge and data provided by other users using similar interactive objects. The platform 802 can also suggest tasks that should be performed by the user to most effectively enhance their Tactile IQ. In some embodiments, platform 802 can test the ability for certain tasks to enhance a user's capabilities.

In some embodiments, the platform 802 first emulates existing standardized and accredited tests in the form of games and challenges and, as the data of the platform grows, and the density of data along with it, new tests will emerge that better and more correctly measure the long line of metrics in a more natural playful setting, in whichever environment the user is.

The platform 802 allows a growing amount of data generated to be streamed and stored to a cloud or remote computing facility for statistical analysis. The result of this computation is presented back to the user in the backend application, where decisions on further games and challenges can be made based on the objective input from the measurements. Finally the next games a user will be presented with are a result of n! Games-played specifically by that one user, also with the results analyzed and compared to the nearest peers and optimized for optimal learning outcome.

Additionally, when a group of users share a common history and games, activities, and results, we can combine these into a cohort. Since these users with a high probability share learning patterns, the system can automatically optimize and experiment for the optimal next game to present a user with, through A/B testing on the whole cohort. The objective of this Self Improving Adaptive Learning and Cognitive Assessment Feedback Loop is to tighten the scores for the whole cohort. A user can at any point in time be associated with a new cohort, as patterns and histories of users evolve, new trends will emerge, and as such, the system shall at all times try to match a user his nearest peers. A cohort thus becomes an ever changing entity of fluctuating sample size accommodating the changing nature of the mind.

Figure 9:
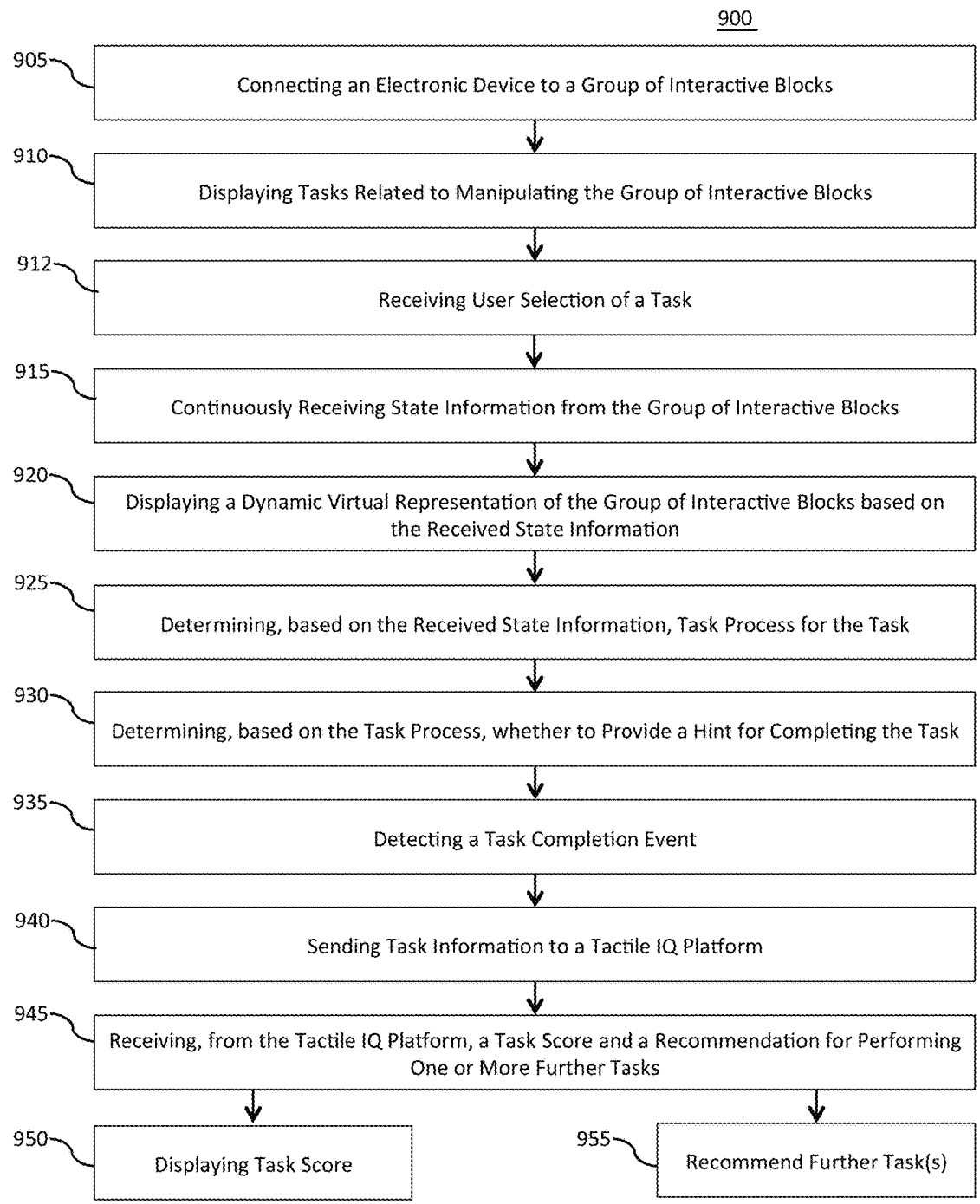
FIG. 9 illustrates a method of monitoring user interaction with a group of interactive blocks, sending interaction data to a tactile IQ platform, and receiving a task score from the tactile IQ platform according to some embodiments of the present technology.

FIG. 9 illustrates a method 900 of monitoring user interaction with a group of interactive blocks, sending interaction data to a tactile IQ platform, and receiving a task score from the tactile IQ platform according to some embodiments of the present technology.

The method 900 involves connecting an electronic device to a group of interactive blocks 905. In some embodiments, connecting an electronic device to a group of interactive blocks 905 can involve connecting the electronic device to a base station that is itself connected to the blocks. In some embodiments, the electronic device connects to a subset of a group of interactive blocks and the blocks in the subset connect the electronic devices to the rest of the group of interactive blocks.

Next, the method 900 involves the electronic device displaying tasks related to manipulating the group of interactive objects 910. As explained above, a wide variety of tasks can be used to test a user's mental acuity, dexterity, spatial awareness, creativity, etc. After receiving a user selection of a task 912, the method 900 involves continuously receiving state information from the group of interactive blocks 915. The state information describes the orientation of the blocks, rotations and movements of each of the blocks, the position of the blocks with respect to other blocks, the coupling status of each of the blocks, the lighting status of the blocks, etc.

The method 900 also involves displaying a dynamic virtual representation of the group of interactive blocks 920 in substantially real-time and based on the received state information. Also, the method 900 involves determining, based on the received state information, task process for the task 925. For example, if the task involves building a structure within a time period, determining task process can involve determining what percent of the structure has been correctly completed at a given time.

In some embodiments, the method 900 can involve determining, based on the task process, whether to provide the user with a hint for completing the task 930. For example, providing a hint can comprise sending a lighting signal to one or more of the interactive blocks that causes the interactive blocks to light up. In another example, providing a hint can involve displaying a textual or graphical hint on the display of the electronic device.

Next, the method 900 involves detecting a task completion event 935. For example, a task completion event can include an actual completion of a task. On the other hand, a task completion event can involve the task ending by nature of the task not being completed according to one or more requirements, e.g. within a certain time period, with a requisite accuracy, in a more efficient manner than a previous attempt, etc.

The method 900 next involves sending task information to a tactile IQ platform 940 and receiving, from the tactile IQ platform, a task score and a recommendation for performing one or more further tasks 945. Finally, the method 900 can involve displaying the task score 950 on the electronic device and/or recommending further tasks 955 through the electronic device.

Figure 10B:
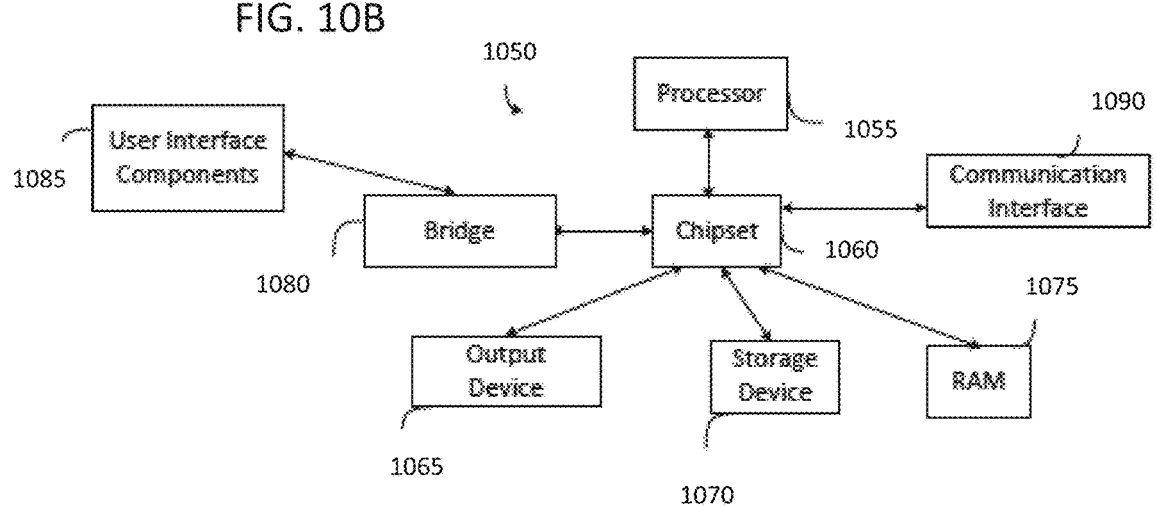

FIG. 10A and FIG. 10B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. An interactive block with a plurality of faces, comprising:
 a processor;
 a sensor configured to determine an orientation of the interactive block;
  coupling features configured to physically couple each of the plurality of faces with any of the faces of a neighboring interactive block in a plurality of inter-coupling configurations;
 a wireless communications interface;
  a plurality of substantially identical block communications interfaces at each one of the plurality of faces, each of the plurality of substantially identical block communications interfaces including a group of exposed electronic contacts, the group of exposed electronic contacts being disposed along a plane of the one of the faces and arranged so as to align with and physically contact a group of exposed electronic contacts disposed along a plane of a face of the neighboring interactive block in at least two of the plurality of inter-coupling configurations so as to provide a communications circuit between the processor of the interactive block and a processor of the neighboring interactive block in the at least two of the plurality of inter-coupling configurations, wherein the group of exposed electronic contacts is in a linear arrangement parallel to an edge of each face in the plurality of faces and offset from a corner of each face in the plurality of faces; and
 a computer-readable medium storing computer-readable instructions, that when executed by the processor are effective to cause the first interactive block to:
  receive, via the at least one communications circuit, electrical signals comprising neighbor data transmitted from the neighboring interactive block;
  determine, based at least on the neighbor data and the orientation of the interactive block, state data for the interactive block and the neighboring interactive block;
  send, through the wireless communication interface, the state data to an electronic device.

2. The interactive block of claim 1, further comprising:
 a light source configured to turn ON responsive to a lighting instruction received via the wireless communications interface.

3. The interactive block of claim 2, wherein the light source is a multi-colored light source and the lighting instruction defines a predefined wavelength for the light source.

4. The interactive block of claim 1, wherein the block has a substantially cube shape.

5. The interactive block of claim 1, wherein the group of exposed electronic contacts comprise one or more electronic contacts that can communicate power level information, send power, or receive power.

6. The interactive block of claim 1, wherein the electronic device comprises a base station for charging the interactive block and the neighboring interactive block, and wherein the contacts on the interactive block can receive power from the base station.

7. The interactive block of claim 1, wherein the coupling features comprise a magnet in each corner of the interactive block.

8. The interactive block of claim 1, wherein the at least two of the plurality of inter-coupling configurations comprise one or more completely aligned coupling configuration for the interactive block and the neighboring block and one or more offset coupling configurations for the interactive block and the neighboring block.

9. The interactive block of claim 2, wherein at least some of the plurality of faces are translucent through which light from the light source can penetrate.

* * * * *